(12) United States Patent
Carl (10) Patent No.: US 9,199,349 B2
(45) Date of Patent: Dec. 1, 2015

(54) THREE-DIMENSIONAL HONEYCOMB CORE MACHINING APPARATUS AND METHOD

(71) Applicant: Rohr, Inc., Chula Vista, CA (US)

(72) Inventor: Ronald Carl, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 328 days.

(21) Appl. No.: 13/707,670

(22) Filed: Dec. 7, 2012

(65) Prior Publication Data
US 2014/0161553 A1      Jun. 12, 2014

(51) Int. Cl.
*B23C 3/00*      (2006.01)
*B23Q 3/08*      (2006.01)
*B23Q 3/06*      (2006.01)

(52) U.S. Cl.
CPC ............... *B23Q 3/086* (2013.01); *B23Q 3/065* (2013.01); *Y10T 29/49998* (2015.01); *Y10T 409/303752* (2015.01); *Y10T 409/304032* (2015.01)

(58) Field of Classification Search
CPC ........ B23C 2/00; B23C 2/02; B23C 2220/48; B23C 2226/62; B23C 2226/27; B23C 2226/37; B23C 2226/61
USPC ........................................ 409/131, 132; 269/7
See application file for complete search history.

(56) References Cited

U.S. PATENT DOCUMENTS

| 995,537 | A | * | 6/1911 | Hertner et al. ............... 269/7 |
|---|---|---|---|---|
| 2,167,215 | A | * | 7/1939 | Leary ............................ 83/15 |
| 2,606,482 | A | * | 8/1952 | Sorensen et al. ............. 269/7 |
| 2,731,713 | A |   | 1/1956 | Schaefer |
| 2,855,664 | A | * | 10/1958 | Griffith et al. ............... 29/424 |
| 2,905,064 | A |   | 9/1959 | Nielsen |
| 2,937,437 | A |   | 5/1960 | Cole et al. |
| 3,083,002 | A | * | 3/1963 | Lacey, Jr. ...................... 269/7 |
| 3,176,387 | A |   | 4/1965 | Argueso, Jr. et al. |
| 3,413,708 | A |   | 12/1968 | Norville et al. |
| 3,574,257 | A | * | 4/1971 | Du Bois et al. ............... 29/424 |
| 3,790,152 | A | * | 2/1974 | Parsons ......................... 269/7 |
| 4,629,378 | A | * | 12/1986 | Parsons ...................... 409/131 |
| 4,730,382 | A | * | 3/1988 | Parsons ........................ 29/563 |
| 4,822,013 | A | * | 4/1989 | Johnson ........................ 269/7 |
| 5,210,926 | A | * | 5/1993 | Newton ........................ 29/559 |
| 6,740,268 | B2 |  | 5/2004 | Hirayama |
| 2011/0306081 | A1 | * | 12/2011 | Szita et al. ................... 435/29 |

FOREIGN PATENT DOCUMENTS

DE            3002468 A1 *   7/1981    ............... B23C 3/00

OTHER PUBLICATIONS

Behringer, Brian J., Robotic Manufacture of Honeycomb Core Details, Society of Mechanical Engineers publication No. MS85-196 (1985).

* cited by examiner

*Primary Examiner* — Sunil K Singh
*Assistant Examiner* — Ryan Rufo
(74) *Attorney, Agent, or Firm* — Kinney & Lange, P.A.

(57) ABSTRACT

An apparatus and method for using an apparatus to machine honeycomb cores are disclosed. A honeycomb core is inserted into a channel in an apparatus with removable dams. The core is flooded with a fluid which is frozen. The frozen block is machined while supported by the apparatus. The block is then melted and the machined honeycomb is removed.

20 Claims, 7 Drawing Sheets

THREE-DIMENSIONAL HONEYCOMB CORE MACHINING APPARATUS AND METHOD

BACKGROUND

Non-solid cores such as honeycomb cores have been used in aerospace applications due to their desirable structural characteristics and low weight. "Honeycomb" refers to the hexagonal structure of the material. Honeycomb materials have been made from metals and composites, and are generally sandwiched between two skins of a solid material to form the core. The skin material is attached to the honeycomb material using known fasteners including adhesives, epoxies, weld joints, and braze joints, among others. The resulting structure approximates a tessellating pattern of hexagonal prisms, where the top and bottom face of each prism is a part of the skin of solid material. Honeycomb cores are structurally strong and, due to the voids within the honeycomb portion, lightweight.

Machining of honeycomb cores has proven difficult using traditional subtractive manufacturing processes. While the finished structure is structurally strong, unfinished honeycomb cores are pliable. Especially when acted upon by forces that are not directed along the axes of individual honeycomb cells, the honeycomb may be deflected during machining. This effect is exacerbated in machining operations on cores in which not all honeycomb cells are aligned along the same axis, such as curved cores. Holding the honeycomb material in a desired form while machining is a technological challenge which has inspired numerous other inventions.

Previously known methods of holding honeycomb cores during machining involve filling portions of the honeycomb with a liquid and then freezing the liquid. The frozen liquid holds the honeycomb in place during machining, and prevents major deflections of the honeycomb material.

SUMMARY

An apparatus capable of machining a honeycomb core has a support that includes a frame and a removable dam which seal together to define a channel. The support is connected to ports for connection to a refrigeration unit and a fluid source.

A method for using an apparatus to machine a honeycomb core is also disclosed. A honeycomb material is positioned on a frame, and a removable dam is attached to the frame, such that the honeycomb material is substantially encapsulated by the frame and the removable dam. The honeycomb material is formed to a desired shape on the frame, and the frame is filled with a liquid such that the honeycomb material is suspended in the liquid. The liquid is frozen, and the frozen liquid and the honeycomb material are machined to remove unwanted portions of the honeycomb material. The liquid is then thawed.

DETAILED DESCRIPTION

Figure 1:
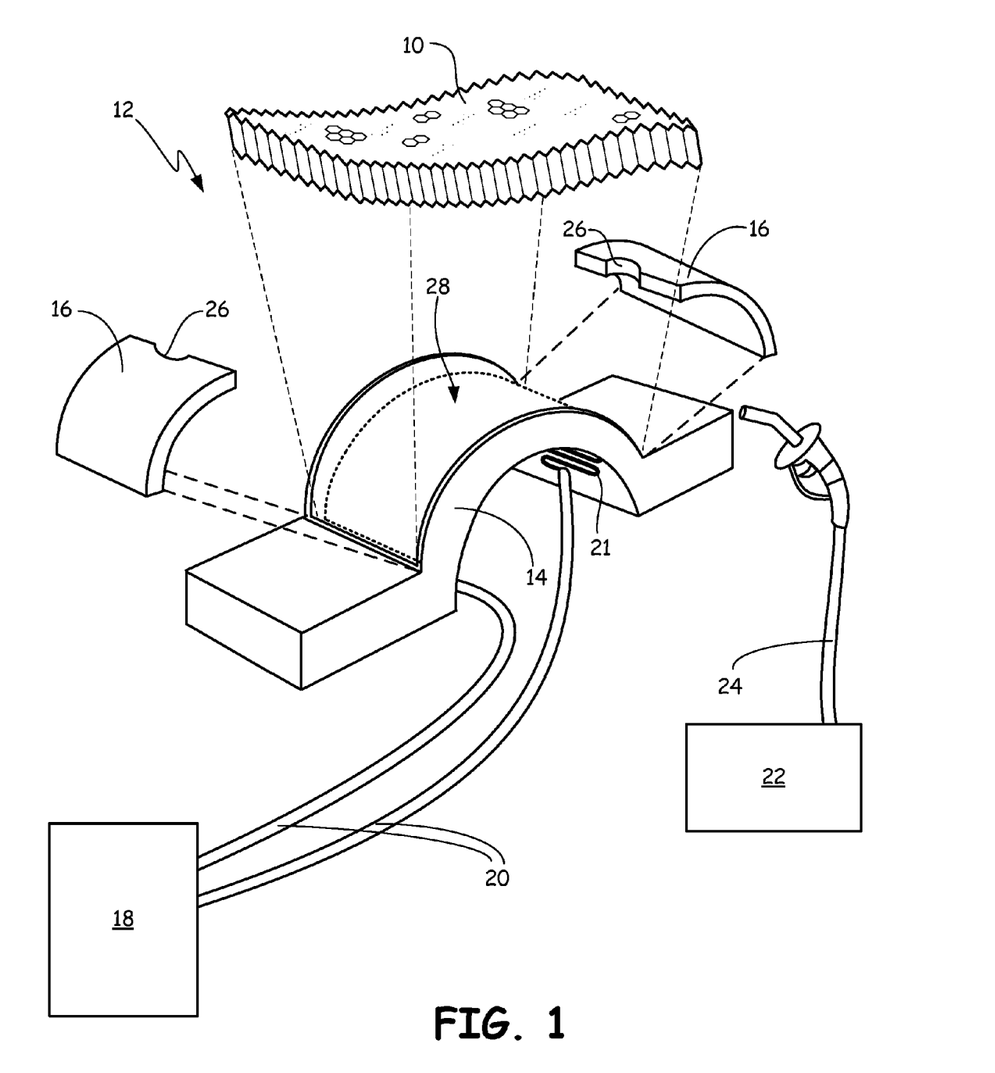
FIG. 1 is a perspective view of a system for machining honeycomb structures.

FIG. 1 shows the first step in machining a honeycomb core incorporating the invention. Subsequent steps are shown in the following FIGS. 2-7. In all of the figures, like numbers are used to refer to like parts.

FIG. 1 shows honeycomb material 10 and machining fixture 12. Machining fixture 12 includes frame 14, removable pads 16, refrigeration unit 18, refrigerant conduits 20, refrigerant coils 21, fluid source 22, and fluid conduit 24. Removable pads include fluid port 26. Frame 14 together with removable pads 16 define channel 28.

Honeycomb material 10 as shown in FIG. 1 is a section of honeycomb material. Honeycomb material 10 may be, for example, made of a metal or a polymer. Unsupported, honeycomb material 10 is pliable. In other embodiments, honeycomb material 10 may have different geometries. For example, honeycomb material 10 may be thinner or thicker than shown in FIG. 1, need not be shaped as a rectangular prism, and need not have hexagonal-shaped cells.

Machining fixture 12 is a device that may be used to create honeycomb cores. Machining fixture 12 is capable of flooding, emptying, and cooling the area surrounding honeycomb material 10, as described in more detail with respect to FIGS. 2-7.

Figure 7:
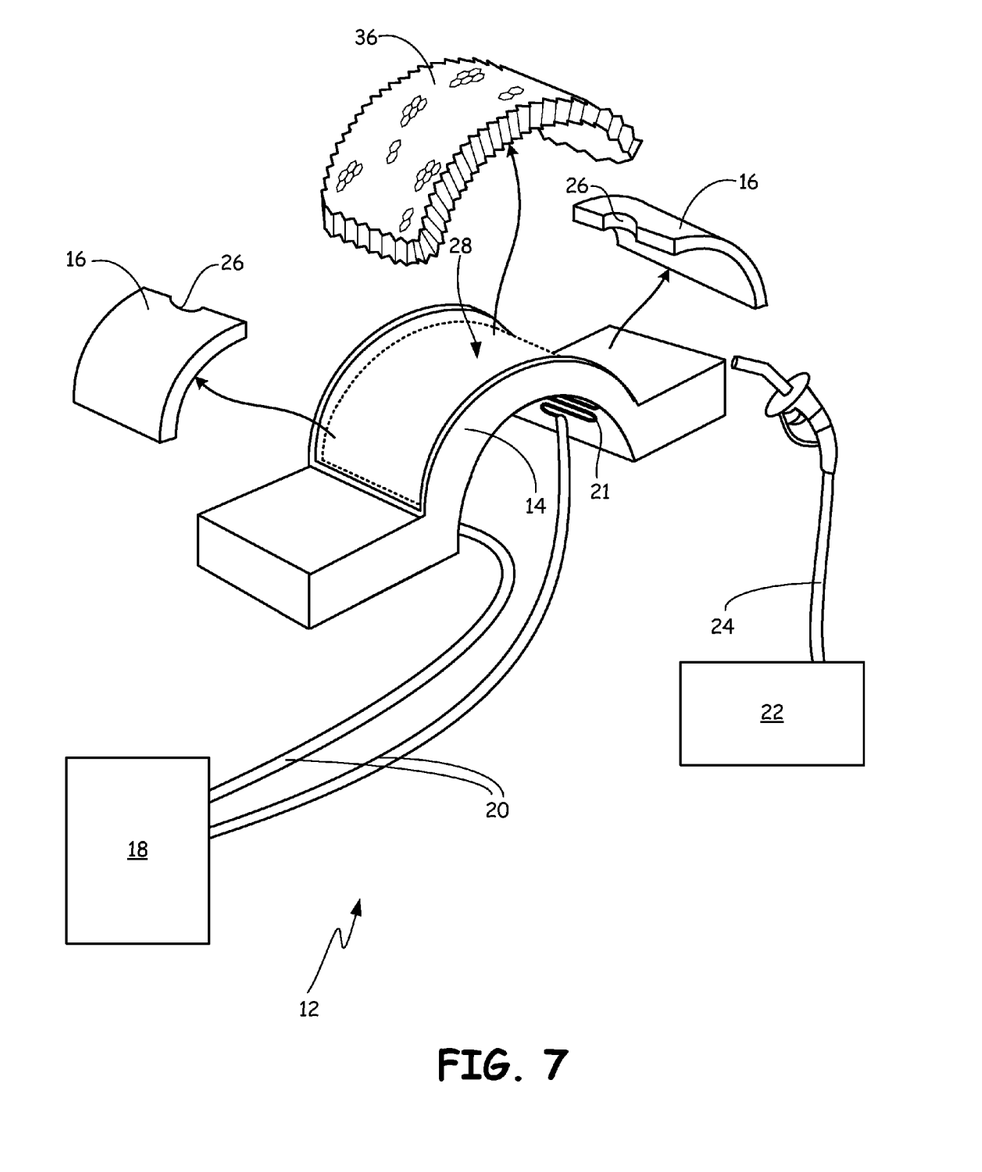
FIG. 7 is a perspective view of the machined honeycomb structure being removed from the system of FIG. 6.

Frame 14 is shaped as an arc in which honeycomb material 10 fits. As shown in FIG. 1, frame 14 is shaped to approximate the radially inner portion of a variable area fan nozzle. In alternative embodiments, frame 14 may be shaped to approximate or match other desirable geometries. Frame 14 is used to form at least a part of a surface of the desired finished honeycomb part 36 (FIG. 7).

Removable pads 16 are used together with frame 14 to define channel 28. Removable pads also include an aperture defining fluid port 26. Removable pads 16 are impermeable to fluids, and are shaped to adjoin frame 14 and other removable pads 16 in a fluid-tight manner.

Refrigeration unit 18 is any system capable of cooling a refrigerant. Refrigeration unit 18 includes a condenser and evaporator, which work to cool the refrigerant. Refrigeration unit 18 is capable of circulating refrigerant through refrigerant conduits 20. Movement of refrigerant through refrigerant conduits 20 causes circulation of refrigerant adjacent to frame 14.

Refrigerant coils 21 are pathways for refrigerant circulated through refrigerant conduits 20 along at least a portion of frame 14. For example, refrigerant coils 21 may be copper tubing brazed to the exterior of frame 14. In alternative embodiments, refrigerant coils 21 may be passageways within frame 14. Refrigerant coils 21 allow for refrigerant to pass from one of refrigerant conduits 20 to the other, while cooling at least a portion of frame 14.

Similarly, fluid source 22 is any system capable of circulating freezable or otherwise solidifiable fluid through fluid conduit 24. Fluid source 22 may be included in the same housing as refrigeration unit 18 in some embodiments. Often, fluid source 22 uses a liquid such as water. Fluid port 26 is an aperture or entry to channel 28 that allows fluid from fluid source 22 to enter. For example, fluid port 26 may include two hemispheres removed from adjacent removable pads 16 to form a circular port. In some embodiments, bleed holes (not shown) may be included in frame 14 or removable pads 16 to allow trapped gases to escape as fluid enters channel 28 through fluid port 26 from fluid source 22. Fluid port 26 may also serve as a passageway for removal of fluid from channel 28. For example, frame 14 may be rotated such that fluid flows out of channel 28 through fluid port 26 after machining is complete, as described with respect to FIG. 6.

Removable pads 16 connect to the upper bounds of frame 14 with respect to FIG. 1. Frame 14 connects to refrigeration unit 18 via refrigerant conduits 20. Refrigerant conduits 20 are connected to frame 14, such that refrigerant may circulate adjacent to at least a portion of frame 14 to cool channel 28. Additionally, channel 28 of frame 14 connects to fluid source 22 via fluid conduit 24 and fluid port 26. Channel 28 substantially encapsulates honeycomb material 10 when removable pads 16 are attached to frame 14, with the possible exception of fluid port 26 and/or bleed systems (not shown).

Fluid source 22 may circulate a solidifiable fluid such as water through fluid conduit 24. Fluid conduit 24 is connected to fluid port 26, allowing fluid to pass from fluid source 22 into or out of channel 28.

As shown in FIG. 1, honeycomb material 10 is positioned above machining fixture 12. Channel 28 is large enough to accommodate honeycomb material 10. Frame 14 defines one boundary or surface of a desired finished part 36 (FIG. 7).

Figure 2:
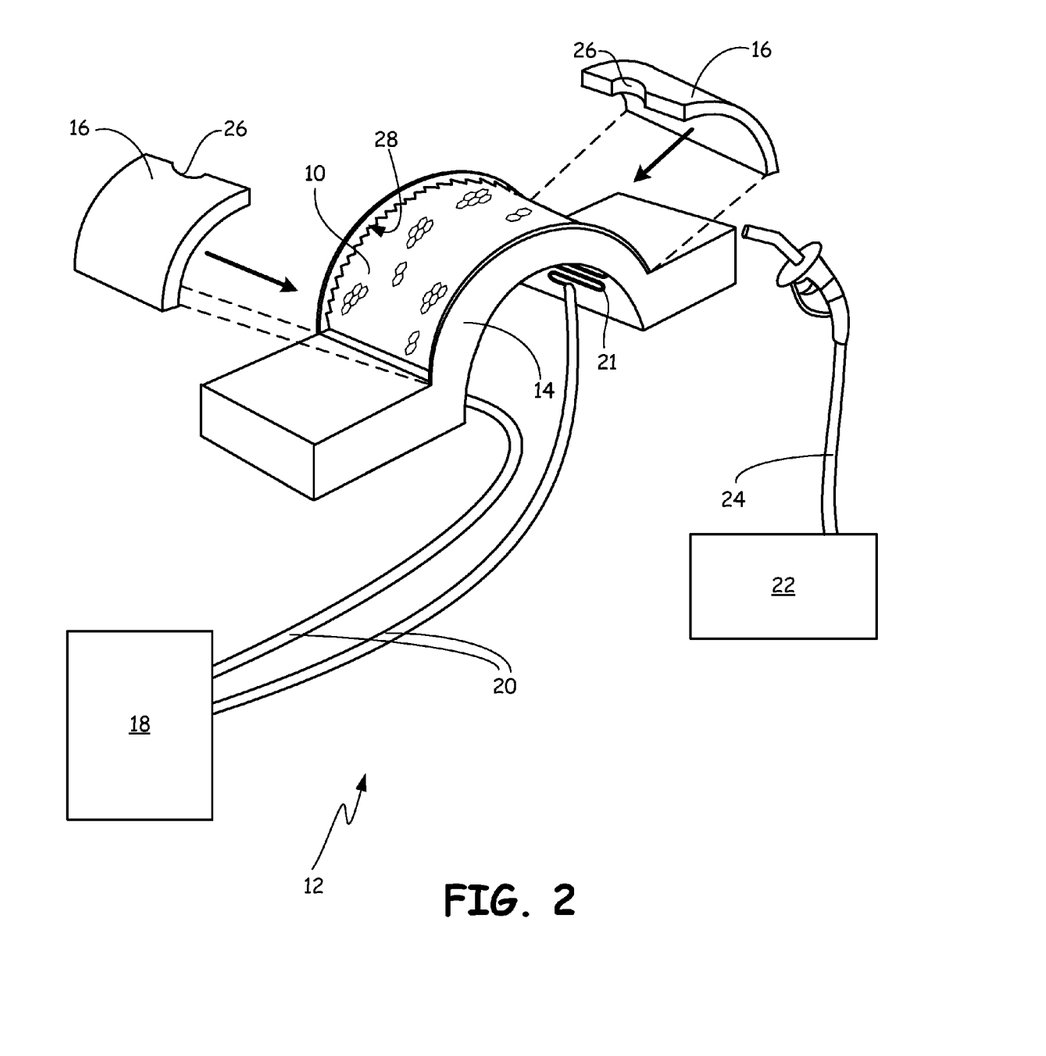
FIG. 2 is a perspective view of the system shown in FIG. 1, with a honeycomb structure loaded into a work stage.

FIG. 2 shows honeycomb material 10 and machining fixture 12, as in FIG. 1. However, as shown in FIG. 2, honeycomb material 10 has been inserted into channel 28. Furthermore, as indicated by arrows, removable pads 16 are used to seal honeycomb material 10 within channel 28, and to form, compress, or otherwise configure and secure honeycomb material 10 to a desired geometry for machining.

Honeycomb material 10 has been inserted into channel 28, to at least partially fill channel 28. The boundaries of channel 28 are defined by frame 14 and removable pads 16. Removable pads 16 seal in a fluid-tight manner with each other and with frame 14. As shown in FIG. 2, removable pads 16 are connected to frame 14 with honeycomb material 10 enclosed in channel 28. Thus, after removable pads 16 are attached to frame 14, honeycomb material 10 is left in a fluid-tight area, with the exception of fluid port 26. Due to its pliability, honeycomb material 10 may be formed to match the shape of frame 14 or removable pads 16.

Figure 3:
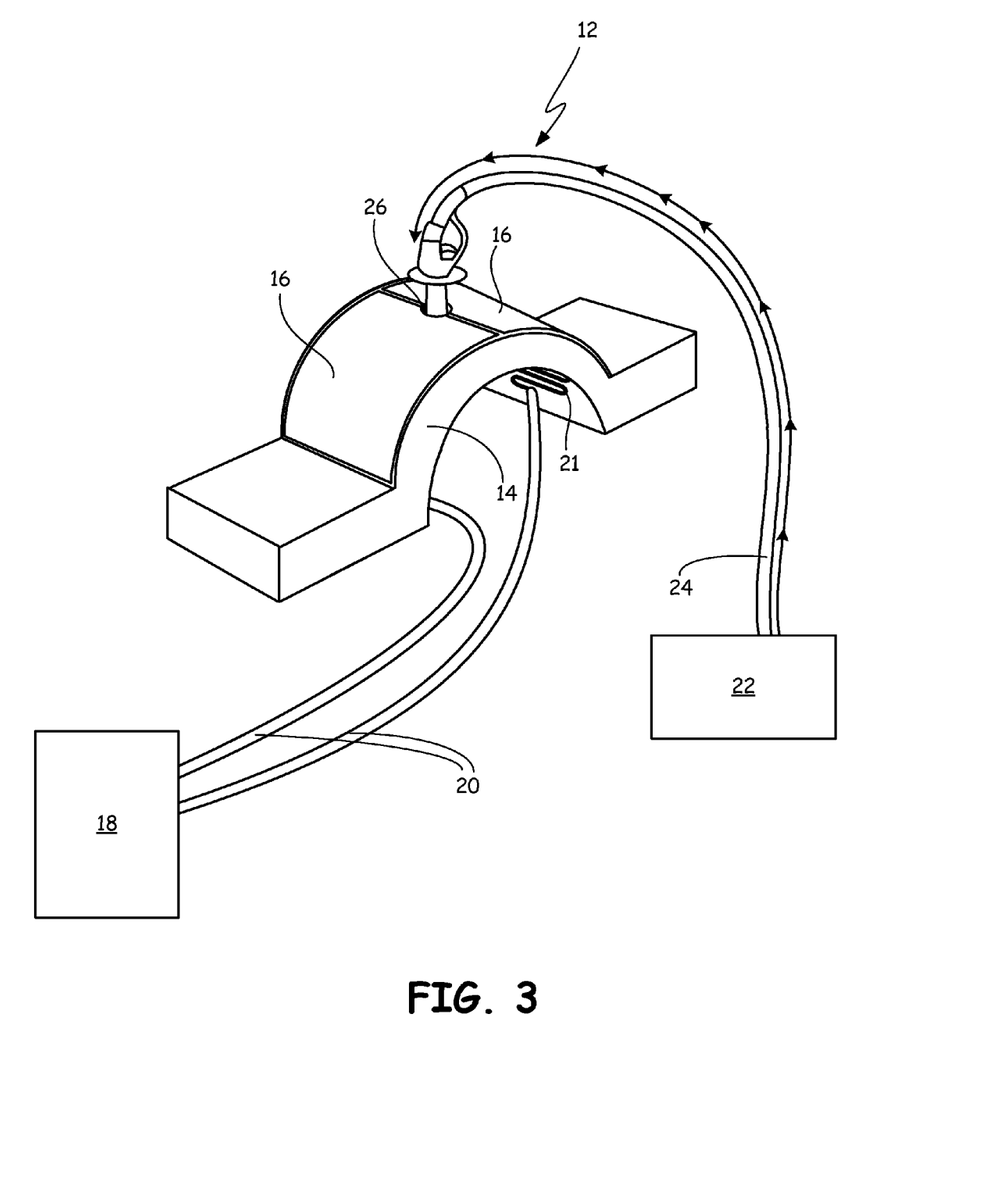
FIG. 3 is a perspective view of the system and honeycomb structure of FIG. 2, with removable pads in the closed position and fluid flooding the system.

FIG. 3 shows the machining fixture 12 of FIGS. 1-2. In particular, FIG. 3 shows machining fixture 12 after removable pads 16 have been attached to frame 14 in a fluid-tight manner. FIG. 3 includes the same parts as shown in FIG. 2, including machining fixture 12. Machining fixture 12 includes frame 14, removable pads 16, refrigeration unit 18, refrigerant conduits 20, fluid source 22, and fluid conduit 24. Frame 14 includes fluid port 26, and frame 14 combines with removable pads 16 to define channel 28 (FIGS. 1-2). As shown in FIG. 3, honeycomb material 10 (FIGS. 1-2) is not visible, as it is encapsulated by frame 14 and removable pads 16. Fluid conduit 24 is used to deliver solidifiable fluid such as water into channel 28 (FIGS. 1-2) of frame 14, and has been connected to fluid port 26. Fluid from fluid conduit 24 also at least partially encapsulates honeycomb 10, in that the hollow portions of honeycomb 10 are flooded so that, when frozen, the fluid will support the structure of honeycomb 10.

The boundaries of channel 28 are defined by frame 14 and removable pads 16. Removable pads 16 seal in a fluid-tight manner with each other and with frame 14. Fluid port 26 is connected to fluid source 22 via fluid conduit 24. As indicated by arrows, fluid conduit 24 is used to transfer fluid from fluid source 22 into frame 14. Fluid passes through fluid port 26 and is released into channel 28 (FIGS. 1-2). In some embodiments, displaced atmosphere from channel 28 (FIGS. 1-2) may be released through a bleed mechanism (not shown) in frame 14 or removable pads 16.

Because removable pads 16 seal to frame 14 in a fluid-tight manner, honeycomb material 10 (FIGS. 1-2) within channel 28 (FIGS. 1-2) can be flooded with fluid transferred through fluid port 26 from fluid source 22 via fluid conduit 24. This facilitates subsequent machining of honeycomb material 10, as will be described with respect to FIG. 5.

Figure 4:
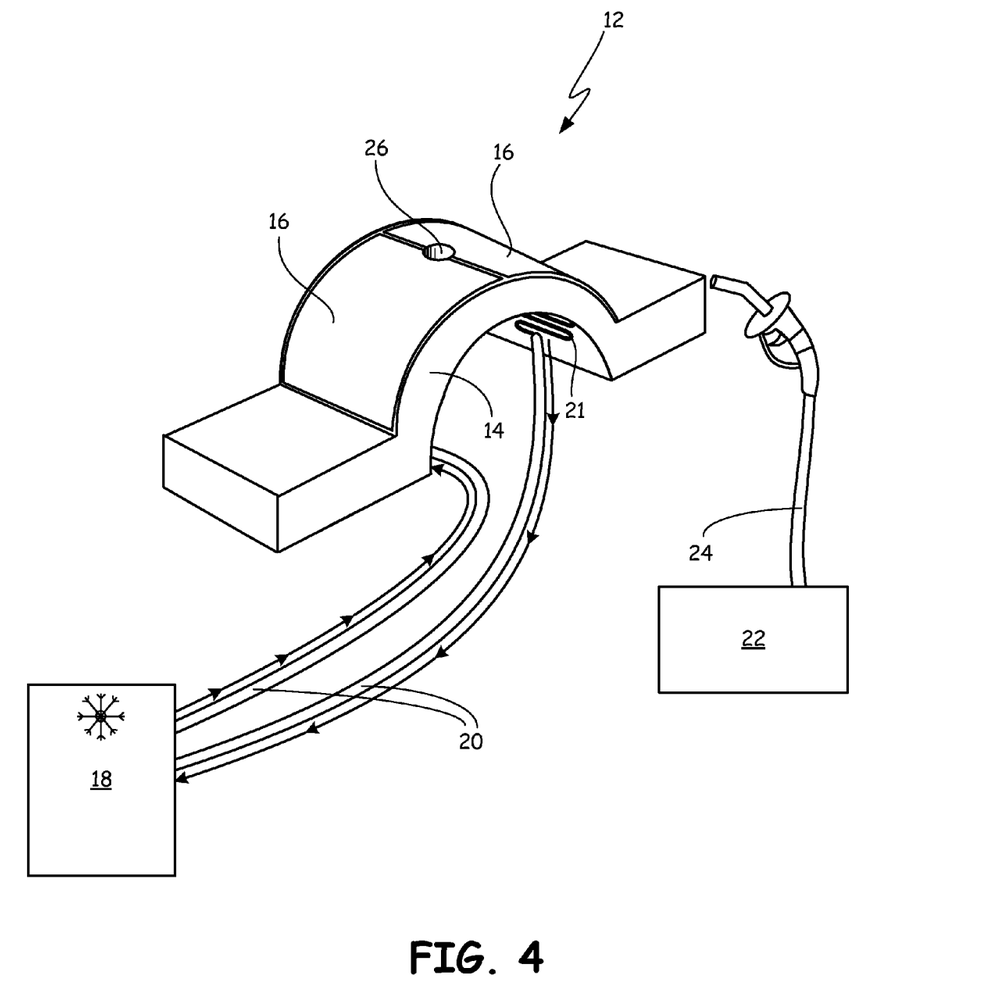
FIG. 4 is a perspective view of the system, honeycomb structure, and pads of FIG. 3, with refrigeration unit working to freeze the fluid.

FIG. 4 shows the same machining fixture 12 of FIGS. 1-3. As shown in FIG. 4, refrigeration unit 18 is operated to send cooled refrigerant to frame 14 via refrigerant conduits 20. The refrigerant used may be any refrigerant which can be cooled below the freezing temperature of the fluid from fluid source 22 that floods channel 28, as described with respect to FIG. 3.

Fluid from fluid source 22 has flooded honeycomb material 10 within channel 28 (FIGS. 1-2). Fluid source 22 is no longer circulating additional fluid through fluid conduit 24. Refrigeration unit 18 is connected to frame 14 via refrigerant conduits 20. Refrigeration conduits 20 form coils 21 or other passageways adjacent to frame 14, such that portions of frame 14 are cooled. Often, refrigeration conduits 20 are arranged such that cooled refrigerant from refrigeration unit 18 passes through frame 14 near channel 28 (FIGS. 1-2).

As shown in FIG. 4, refrigeration unit 18 cools a refrigerant (indicated by the snowflake on refrigeration unit 18). Cooled refrigerant is circulated through refrigerant conduits 20 and refrigerant coils 21. Refrigerant cools frame 14, then returns to refrigeration unit 18 via refrigerant conduits 20. This results in cooling of frame 14 and adjacent materials, such as fluid within channel 28 (FIGS. 1-2). Refrigeration continues at least until fluid within channel 28 (FIGS. 1-2) is frozen into a solid. In some embodiments, refrigeration of refrigerant continues during machining of frozen honeycomb block 30 (FIG. 5).

Once fluid within channel 28 (FIGS. 1-2) is frozen, honeycomb material 10 is supported and prevented from deforming by the resultant frozen solid. This frozen honeycomb block 30 (FIG. 5) may be machined without deformation due to forces applied by machining or milling equipment.

Figure 5:
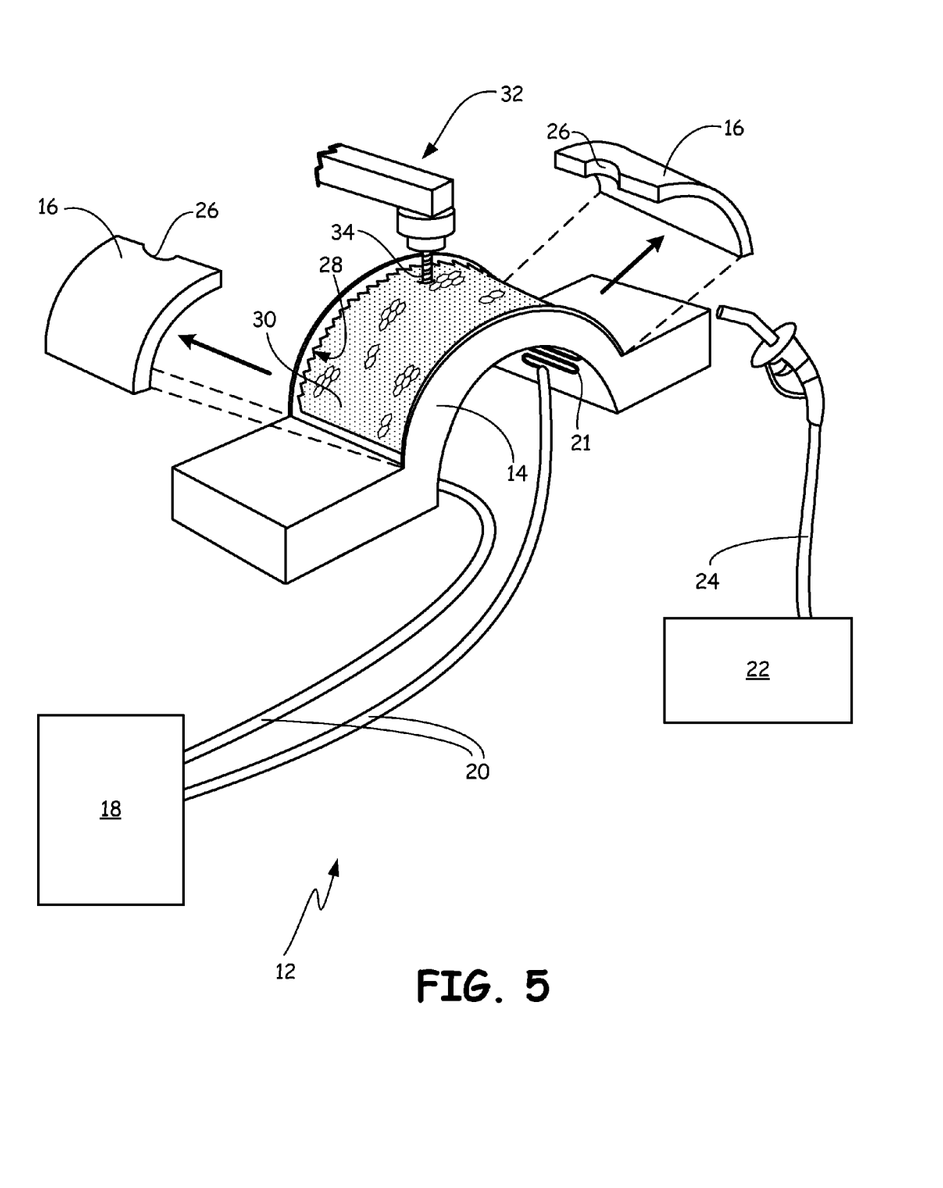
FIG. 5 is a perspective view of the system and honeycomb structure frozen in ice of FIG. 4, and further showing machining of the honeycomb structure and ice (shown as stippling).

FIG. 5 shows machining fixture 12, as well as frozen honeycomb block 30 and milling system 32. Machining fixture 12 includes the same components as shown in FIGS. 1-4, such as frame 14, removable pads 16, refrigeration unit 18, refrigerant conduits 20, fluid source 22, and fluid conduit 24. Frozen honeycomb block 30 contains honeycomb material 10 (FIGS. 1-2), encased in frozen fluid (shown in stipple) that was supplied by fluid source 22. Milling system 32 can be a subtractive manufacturing device which can be used to drill away portions of honeycomb block 30. Milling system 32 as shown in FIG. 5 includes drill 34, which is capable of milling away portions of frozen honeycomb block 30. Milling system 32 is movable such that drill 34 may selectively remove desired portions of frozen honeycomb block 30.

Frozen honeycomb block 30 is secured within channel 28 by solidified fluid 22 within channel 28. Removable pads 16 have been disconnected from frame 14, such that frozen honeycomb block 30 is exposed along at least one face. Milling system 32 is positioned above frozen honeycomb block 30 with respect to FIG. 5. Drill 34 is connected to milling system 32. Removable pads 16 are removed, exposing frozen honeycomb block 30 in channel 28 to milling system 32. Milling system 32 drives drill 34 to remove portions of frozen honeycomb block 30. Milling system 32 is moved across the surface of frozen honeycomb block 30 previously covered by removable pads 16, removing portions of frozen honeycomb block 30 to a desired depth within channel 28.

By securing frozen honeycomb block 30 within channel 28 and removing pads 16, honeycomb material 10 may be machined from block 30 without fear of deformation due to forces applied by the machining apparatus. As shown in FIG. 5, honeycomb material 10 is formed to have a desired inner radius defined by frame 14, and any desired outer radius may be machined using milling system 32. For example, features such as an aerodynamic profile may be milled into frozen honeycomb block 30.

Figure 6:
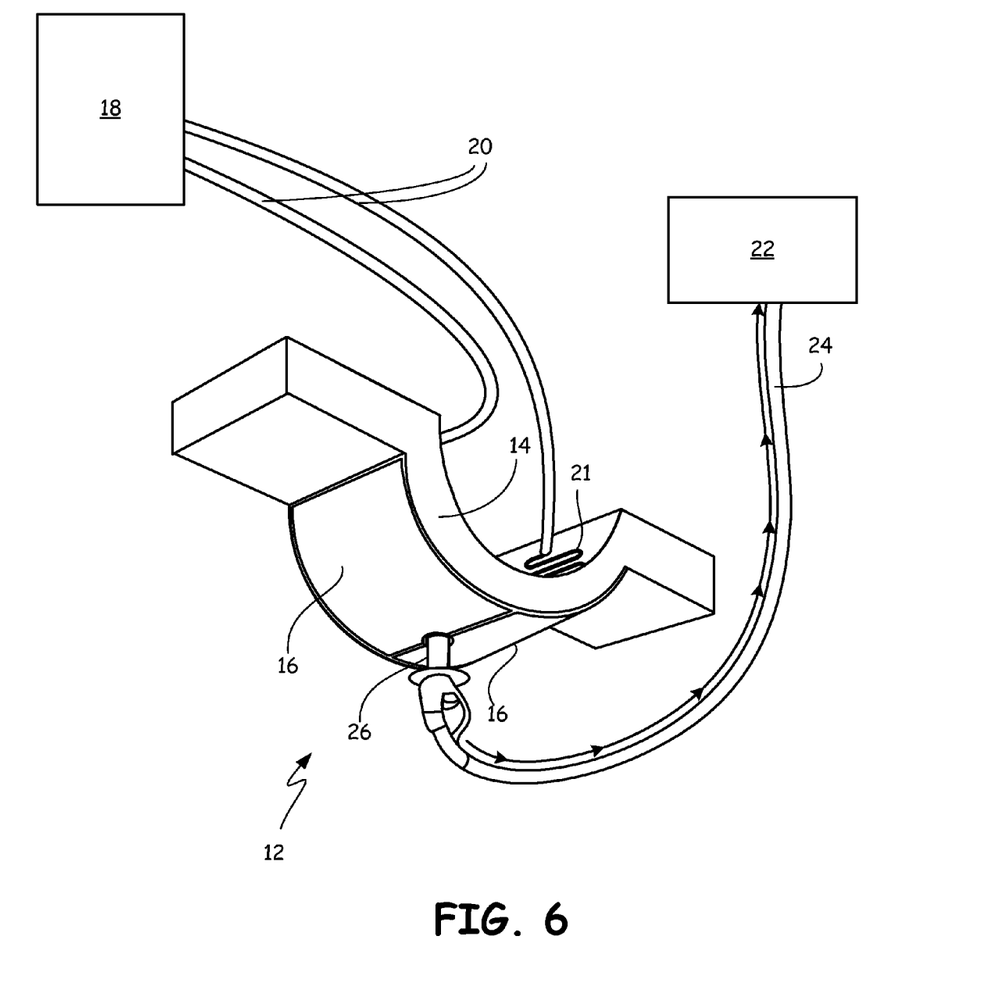
FIG. 6 is a perspective view of the machined honeycomb structure in the system of FIG. 5, and further showing melting the ice and draining away of the resulting fluid.

FIG. 6 shows machining fixture 12 during melting of honeycomb block 30 (FIG. 5). Machining fixture 12 includes frame 14, removable pads 16, refrigeration unit 18, refrigerant conduits 20, fluid source 22, and fluid conduit 24. Frame 14 includes fluid port 26, and frame 14 combines with removable pads 16 to define channel 28 (FIG. 5). Honeycomb material 10 (FIGS. 1-2) is not visible, as it is encapsulated by frame 14 and removable pads 16. In some embodiments, fluid conduit 24 may be a single conduit used to both transfer fluid to and from frame 14. In other embodiments, fluid conduit 24 may only transfer fluid to frame 14. Notably, as shown in FIG. 6, machining fixture 12 is rotated such that melted fluid drains out of channel 28 (FIGS. 1-2) via fluid port 26.

FIG. 6 shows machining fixture 12 as frozen honeycomb block 30 (FIG. 5) is melted. This may be accomplished either by passive heating, as shown in FIG. 6, or in alternative embodiments frame 14 may be heated to expedite melting. As indicated by arrows, fluid conduit 24 is used to transfer melted fluid from frame 14 towards fluid source 22. Fluid port 26 receives melted fluid, and drains the melted fluid towards fluid source 22. In some embodiments, atmosphere may be admitted into channel 28 (FIG. 5) through fluid conduit 24, or through a release mechanism (not shown) in frame 14 or one of removable pads 16 to prevent pressure lock. In other embodiments, a gap may be left between frame 14 and/or removable pads to admit atmosphere into channel 28 (FIG. 5). In other embodiments, melted fluid may drain from frame 14, rather than being returned to fluid source 22.

By melting the frozen fluid in frozen honeycomb block 30 (FIG. 5), honeycomb material 10 in channel 28 (FIG. 5) is left unsupported, and may be removed from machining fixture 12. Honeycomb material 10 has been machined, as described with respect to FIGS. 5 and formed, as described with respect to FIGS. 1-2. Thus, after the steps shown in FIGS. 1-6 are complete, honeycomb material 10 is formed and machined, and a finished part has been created.

FIG. 7 shows finished part 36 being removed from machining fixture 12. FIG. 7 shows machining fixture 12, which includes frame 14, removable pads 16, refrigeration unit 18, refrigerant conduits 20, fluid source 22, and fluid conduit 24. Frame 14 and removable pads 16 define channel 28.

In FIG. 7, finished part 36 has been formed and machined by machining fixture 12, as described with respect to FIGS. 1-6. Removable pads 16 are detached so that finished part 36 may be removed from channel 28. Finished part 36 includes features along at least one surface, such as an aerodynamic profile.

LISTING OF POTENTIAL EMBODIMENTS

In one embodiment, an apparatus for machining a honeycomb structure includes a support, and the support comprises a frame, a removable dam configured to seal to the frame, and a channel between the frame and the removable dam. A refrigeration unit and a fluid source are coupled with the support.

In another embodiment, a honeycomb material is disposed along a surface of the support, and at least a portion of the outer face of the honeycomb material is defined by the surface of the support.

In another embodiment, the surface of the frame is arcuate.

In another embodiment, a skin layer is applied on at least one layer of the honeycomb material.

In another embodiment, the apparatus includes a milling system.

In another embodiment, the refrigeration unit is configured to cool at least a portion of the support.

In another embodiment, the fluid source is configured to release a fluid into the channel.

In another embodiment, a fluid port is positioned to release the fluid from the fluid source into the channel.

A method for manufacturing a honeycomb structure includes: positioning a honeycomb material on a frame; attaching a removable dam to the frame, such that the honeycomb material is substantially encapsulated by the frame and the removable dam; forming the honeycomb material to a desired shape using the frame; filling the frame with a liquid such that the honeycomb material is suspended in the liquid; freezing the liquid; machining the frozen liquid and the honeycomb material to remove unwanted portions of the honeycomb material; thawing the liquid; and draining the liquid.

Another embodiment of the method includes machining the frozen liquid while the honeycomb material is positioned on the frame. Yet another embodiment includes using a plurality of removable pads to form the removable dam.

Another embodiment of the method includes forming the honeycomb material to a desired shape by using the removable pads to hold at least one face of the honeycomb material in direct contact with the frame.

Another embodiment of the method includes passing a refrigerant through the frame until the liquid solidifies.

Another embodiment of the method includes machining the frozen liquid by: removing the removable dam, driving a milling system to remove unwanted portions of the frozen liquid and the honeycomb material, and then replacing the removable dam.

Another embodiment of the method includes removing the removable dam from the frame after freezing the liquid and prior to machining.

Another embodiment of the method includes using water as the liquid.

Another embodiment of the method includes thawing the liquid by heating the frame.

Another embodiment of the method includes thawing the liquid by allowing the frozen liquid to melt under ambient conditions.

Another embodiment of the invention includes removing the thawed liquid from the frame.

Another embodiment of the method includes applying a skin layer on at least a portion of a surface of the honeycomb material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus for forming a honeycomb structure, the apparatus comprising:
   an arcuate frame;
   an arcuate channel formed on a first side of the frame and configured to receive the honeycomb structure; and
   at least one arcuate pad removably connected to the first side of the frame to cover and substantially enclose the arcuate channel.

2. The apparatus of claim 1, wherein the channel is configured to form at least a portion of a face of the honeycomb structure.

3. The apparatus of claim 1, and further comprising a milling system.

4. The apparatus of claim 1, and further comprising a refrigeration unit attachable to a second side of the frame disposed opposite the first side of the frame, wherein the refrigeration unit is configured to cool at least a portion of the frame.

5. The apparatus of claim 1, and further comprising a fluid source attachable to the frame, wherein the fluid source is configured to releases a fluid into the channel.

6. The apparatus of claim 5, wherein a fluid port is positioned to release the fluid from the fluid source into the channel.

7. A method for manufacturing a shaped honeycomb structure, the method comprising:
   positioning a honeycomb material on an arcuate frame;
   attaching at least one pad to the frame, such that the honeycomb material is substantially encapsulated by the frame and the at least one pad;
   forming the honeycomb material to a desired shape using the frame;
   filling the frame with a liquid such that the honeycomb material is substantially encapsulated by the liquid, wherein the liquid is water;
   freezing the liquid;
   machining the frozen liquid and the honeycomb material to remove unwanted portions of the honeycomb material;
   thawing the frozen liquid; and
   draining the liquid.

8. The method of claim 7, wherein machining the frozen liquid and the honeycomb material is performed while the honeycomb material is positioned on the frame.

9. The method of claim 7, wherein the at least one pad includes a plurality of removable pads.

10. The method of claim 7, wherein forming the honeycomb material to a desired shape using the frame includes holding at least one face of the honeycomb material in direct contact with the frame.

11. The method of claim 7, wherein freezing the liquid comprises passing a refrigerant through the frame until the liquid solidifies.

12. The method of claim 7, wherein machining the frozen liquid includes:
    removing the at least one pad;
    driving a milling system to remove unwanted portions of the frozen liquid and the honeycomb material; and then
    replacing the at least one pad.

13. The method of claim 7, further comprising removing the at least one pad from the frame after freezing the liquid and prior to machining.

14. The method of claim 7, wherein thawing the liquid includes heating the frame.

15. The method of claim 7, wherein thawing the liquid includes allowing the frozen liquid to melt under ambient conditions.

16. The method of claim 7, and further comprising removing thawed liquid.

17. A method for manufacturing a shaped honeycomb structure, the method comprising:
    positioning a honeycomb material on an arcuate surface of a first member to bend the honeycomb structure to match the arcuate surface;
    attaching a second member to the first member to form a substantially enclosed chamber around the honeycomb structure;
    filling the substantially enclosed chamber with a liquid to substantially submerge the honeycomb structure in the liquid;
    solidifying the liquid to form a solid which supports the honeycomb structure; and
    machining the honeycomb structure while submerged in the solidified liquid and while bent to the shape of the arcuate surface.

18. The method of claim 17 further comprising:
    removing the second member prior to machining the honeycomb structure.

19. The method of claim 17 further comprising:
    re-liquefying the liquid after machining the honeycomb structure; and
    draining the liquid from the honeycomb structure.

20. The apparatus of claim 5, wherein the fluid is water.

* * * * *